US007735763B2

(12) United States Patent
Bell et al.

(10) Patent No.: US 7,735,763 B2

(45) Date of Patent: Jun. 15, 2010

(54) PILL CRUSHER WITH PILL HOLDER VERIFICATION AND SAFETY FEATURES

(75) Inventors: Brian D Bell, Wyoming, NY (US); Charles Kenton Akers, Williamsville, NY (US); Sean D Anderson, Powhatan, VA (US); William Riley, Richmond, VA (US); Bruce Seymour Ferris, Richmond, VA (US)

(73) Assignee: First Wave Products Group, LLC, Buffalo, NY (US)

( * ) Notice: Subject to any disclaimer, the term of this patent is extended or adjusted under 35 U.S.C. 154(b) by 170 days.

(21) Appl. No.: 11/856,487

(22) Filed: Sep. 17, 2007

(65) Prior Publication Data

US 2009/0072059 A1 Mar. 19, 2009

(51) Int. Cl.
*A47J 42/06* (2006.01)

(52) U.S. Cl. .................................................. 241/169.1

(58) Field of Classification Search ...... 241/168–169.2, 241/258

See application file for complete search history.

(56) References Cited

U.S. PATENT DOCUMENTS

| | | | |
|---|---|---|---|
| 1,165,686 | A | 12/1915 | McElroy |
| 2,631,786 | A | 3/1953 | Morgan et al. |
| 2,892,595 | A | 6/1959 | Tupper |
| 3,915,393 | A | 10/1975 | Elkins |
| 4,003,523 | A | 1/1977 | Doolittle |
| 4,057,052 | A | 11/1977 | Kaufman et al. |
| 4,121,775 | A | 10/1978 | Roseberg et al. |
| 4,209,136 | A | 6/1980 | Linden et al. |
| 4,212,430 | A | 7/1980 | Dale et al. |
| 4,273,297 | A | 6/1981 | Rinfret et al. |
| 4,366,930 | A | 1/1983 | Trombetti, Jr. |
| 4,568,331 | A | 2/1986 | Fischer et al. |
| D285,966 | S | 9/1986 | Porter |
| 4,715,854 | A | 12/1987 | Vailancourt |
| 4,765,549 | A | 8/1988 | Sherman |
| 4,924,636 | A | 5/1990 | Hoffman |
| D310,564 | S | 9/1990 | Besaw |
| 4,967,971 | A | 11/1990 | Smith |
| 5,025,996 | A | 6/1991 | Lavin et al. |
| 5,067,666 | A | 11/1991 | Sussman |
| 5,123,601 | A | 6/1992 | Lavin et al. |
| 5,178,337 | A | 1/1993 | Lupoli |
| D337,828 | S | 7/1993 | Gordon |
| 5,248,102 | A | 9/1993 | Bohn |
| 5,322,227 | A | 6/1994 | Fiochi |

(Continued)

FOREIGN PATENT DOCUMENTS

| | | |
|---|---|---|
| CA | 2057245 | 6/1993 |

(Continued)

*Primary Examiner*—Faye Francis
(74) *Attorney, Agent, or Firm*—Woods Oviatt Gilman LLP

(57) ABSTRACT

A pill crusher device and method including a base and a lid movable between open and closed positions with respect to the base. The base includes a pill cup holder for holding a cup with one or more pills therein. The cup may include a flange that is keyed to the cup holder to prevent the cup from rotating with the cup holder. A head protrudes from the inside surface of the lid and is shaped to nest within the cup either directly against the pills, or against a second cup placed in the first cup with the pills located between the two cups.

16 Claims, 3 Drawing Sheets

U.S. PATENT DOCUMENTS

| | | | |
|---|---|---|---|
| 5,376,072 | A | 12/1994 | Klearman et al. |
| 5,464,393 | A | 11/1995 | Klearman et al. |
| 5,472,421 | A | 12/1995 | Klearman et al. |
| 5,478,311 | A | 12/1995 | Klearman |
| 5,531,386 | A | 7/1996 | Jensen |
| 5,553,793 | A | 9/1996 | Klearman et al. |
| 5,618,004 | A | 4/1997 | Klearman et al. |
| 5,660,342 | A | 8/1997 | Bock |
| 5,718,681 | A | 2/1998 | Manning |
| 5,823,451 | A | 10/1998 | Sharpe |
| 5,863,001 | A | 1/1999 | Schulze |
| D405,889 | S | 2/1999 | Parsons |
| 5,915,637 | A | 6/1999 | Parsons |
| 5,924,636 | A | 7/1999 | Calderon |
| 6,059,209 | A | 5/2000 | Barson |
| D433,148 | S | 10/2000 | Dennis |
| 6,357,679 | B1 | 3/2002 | Radke |
| 6,508,424 | B1 | 1/2003 | Marshall |
| 6,523,766 | B1 | 2/2003 | Watt |
| D476,735 | S | 7/2003 | Zinnbauer |
| 6,622,949 | B1 | 9/2003 | Baswick et al. |
| 6,637,683 | B1 | 10/2003 | Wilbur |
| 6,637,685 | B1 | 10/2003 | Kruger |
| D497,543 | S | 10/2004 | Buckley |
| D502,267 | S | 2/2005 | Leyshon et al. |
| 6,966,509 | B2 | 11/2005 | Janzen |
| 7,032,851 | B2 | 4/2006 | Demske et al. |
| 7,051,963 | B1 | 5/2006 | Buckley |
| D528,781 | S | 9/2006 | Leyshon et al. |
| D534,279 | S | 12/2006 | Leyshon et al. |
| D534,657 | S | 1/2007 | Leyshon |
| D545,622 | S | 7/2007 | Gomez |
| 2003/0155458 | A1 | 8/2003 | Shewchuk |
| 2005/0127218 | A1 | 6/2005 | Demske et al. |
| 2005/0133645 | A1 | 6/2005 | Janzen |
| 2006/0043224 | A1 | 3/2006 | Weisbeck |
| 2006/0043225 | A1 | 3/2006 | Peron et al. |
| 2006/0088422 | A1 | 4/2006 | Hall et al. |
| 2006/0091246 | A1 | 5/2006 | Greenwald et al. |
| 2006/0113411 | A1 | 6/2006 | Buckley |

FOREIGN PATENT DOCUMENTS

| | | | |
|---|---|---|---|
| CA | 2486472 | | 5/2005 |
| CA | 2374106 | A | 4/2006 |
| CN | 2464332 | Y | 12/2001 |
| DE | 19706341 | A1 | 2/1997 |
| DE | 102005005446 | A1 | 8/2006 |
| GB | 1552749 | A | 9/1979 |
| JP | 02261457 | A2 | 10/1990 |
| KR | 2028535 | A | 4/2002 |

PILL CRUSHER WITH PILL HOLDER VERIFICATION AND SAFETY FEATURES

BACKGROUND OF THE INVENTION

The present invention relates to pill crushing devices and methods.

Pills that are taken orally are typically offered in tablet form (usually round, oblong, rectangular or triangular in shape) with directions to swallow the pill whole with water. Some pills are also offered in chewable form. Pills pose a problem for people who are unable to chew or swallow a pill whole (e.g., the elderly and infirm). For these people, it is necessary to crush the pill into a powdered form that may then be mixed with an easily swallowed food or liquid such as pudding or juice, for example. Many different types of pill crushers have been proposed but there still remains a need for a pill crusher device and method that successfully integrates the following features:

1. quick, easy to use and compact size for easy transportability, particularly in a nursing home setting.
2. prevents cross-contamination between crushing of different pills.
3. interrogation of the pill holder to ensure proper holder placement in the device and prevent accidental contamination from unauthorized pill holders.

SUMMARY OF THE INVENTION

The present invention provides a pill crusher device and method including a base and a lid movable between open and closed positions with respect to the base. The base includes a pill cup holder for holding a cup with one or more pills therein. The cup may include a flange that is keyed to the cup holder to prevent the cup from rotating with the cup holder. A head protrudes from the inside surface of the lid and is shaped to nest within the cup either directly against the pills, or against a second cup placed in the first cup with the pills located between the two cups.

The cup holder is seated on a rotatable platform connected to a motor. With the lid closed, the motor is actuated causing the pill holder to simultaneously rotate and linearly translate toward the lid, causing the pills to be crushed and ground. The motor is actuated in the reverse direction thereby lowering the platform and cup holder. The lid may then be opened and the cup retrieved from the cup holder along with the crushed pills within the cup.

Cup interrogation may be included to ensure only approved cups are used with the device and prevent accidents caused by activating the motor with no cup in place. Ensuring only approved cups are used with the device adds quality control (e.g., requiring cups made of only medical grade plastics that will not break or otherwise degrade within the device) and prevents potential contamination with cups that may have come from an unregulated or otherwise unknown source.

Status indicator displays or lights may also be included to tell the user the condition of the device (e.g., opened, closed-unactuated, closed-actuated, finished, etc.).

DETAILED DESCRIPTION

Figure 1:
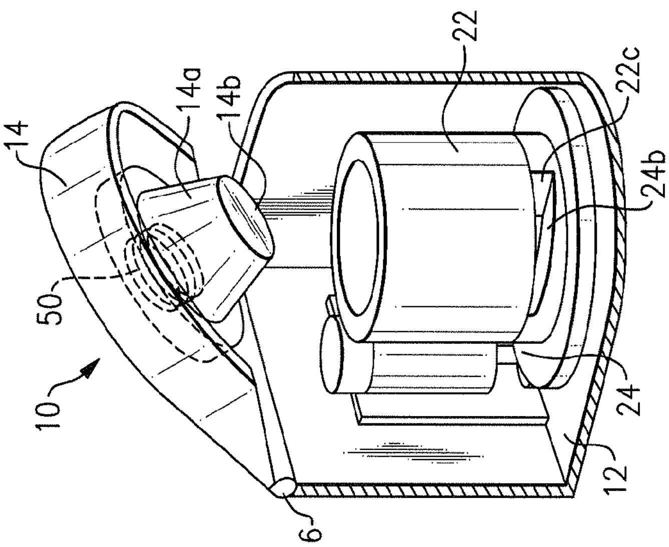
FIG. 1 is a perspective view of an embodiment of a pill crushing device in the open position.
Figure 2:
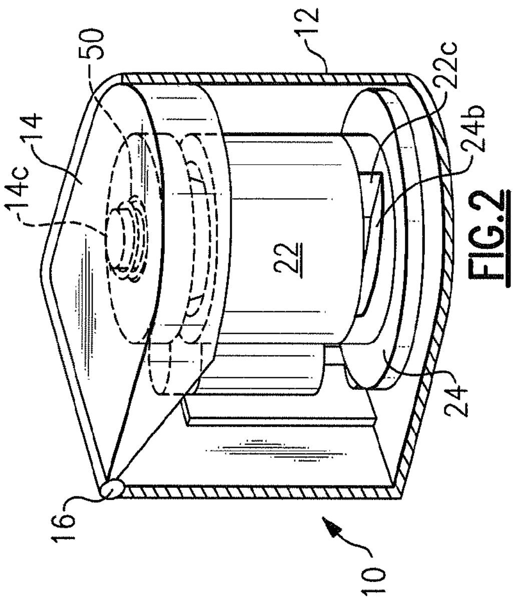
FIG. 2 is the view of FIG. 1 showing the pill crushing device in the closed, unactuated position.
Figure 3:
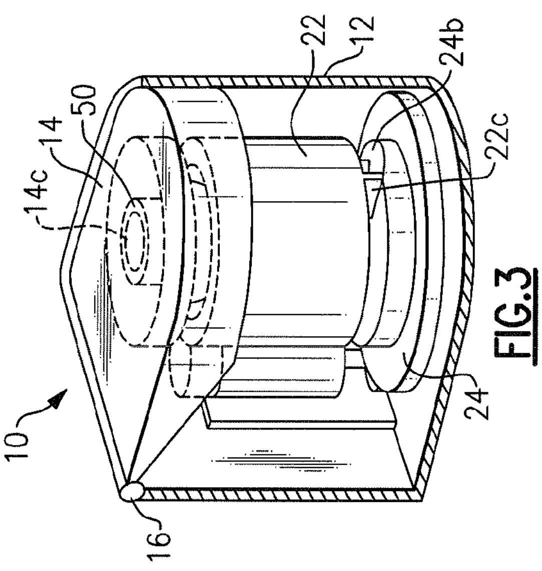
FIG. 3 is the view of FIG. 1 showing the pill crushing device in the closed, actuated position.
Figure 4:
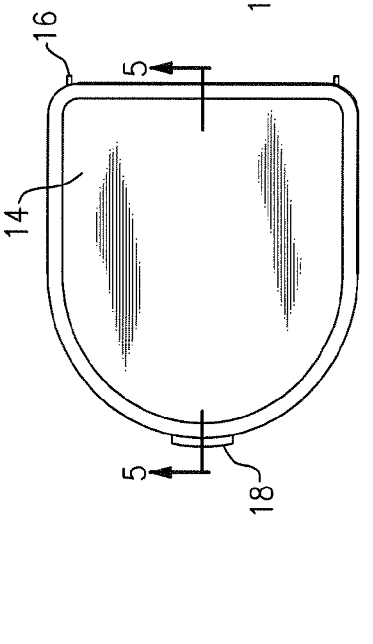
FIG. 4 is a lid plan view of FIG. 2.

Referring now to the drawings, there is seen in FIGS. 1-5 an embodiment of a pill crushing device 10 having a base 12 and a lid 14. Lid 14 may be opened (FIG. 1) and closed (FIGS. 2-5) relative to base 12 via a hinge 16, for example. A latch 18 or other securing feature may be used for releasably securing lid 14 in the closed position relative to base 12. It is preferred that latch 18 is of a type that allows for easy opening and closing yet securely holds the lid to the base when in the closed position.

Figure 6A:
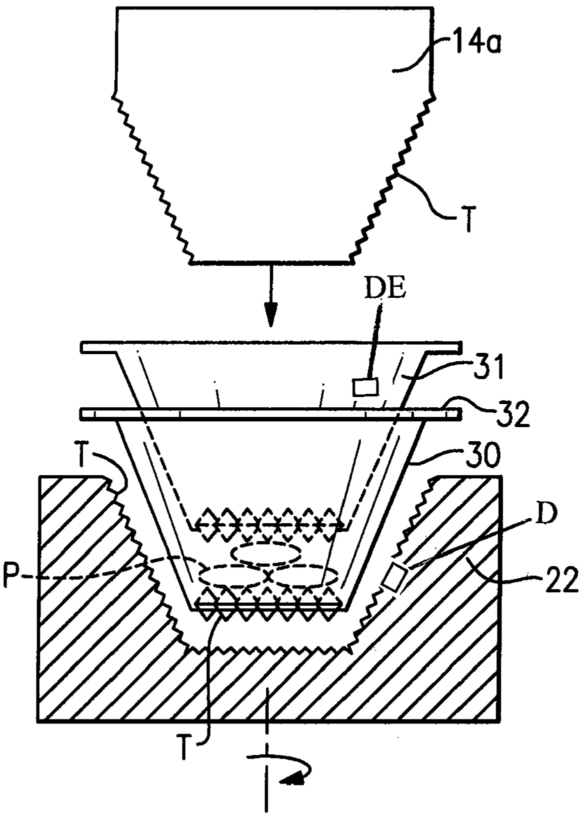
FIG. 6 is a perspective view of an embodiment of a cup for holding the pill in the pill crushing device.
Figure 6B:
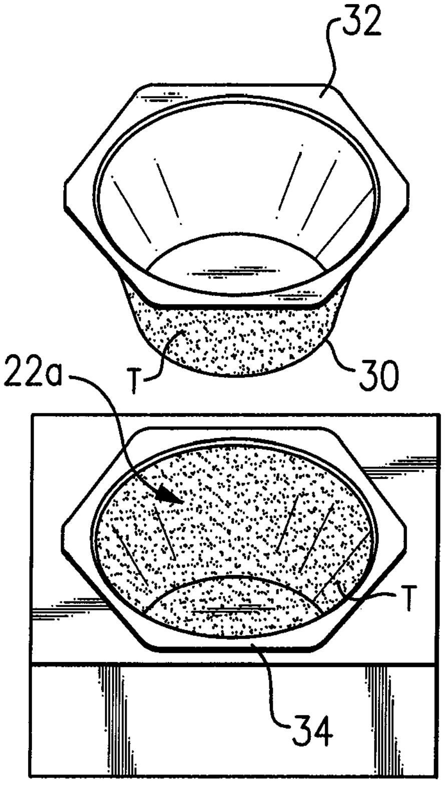
Figure 7:
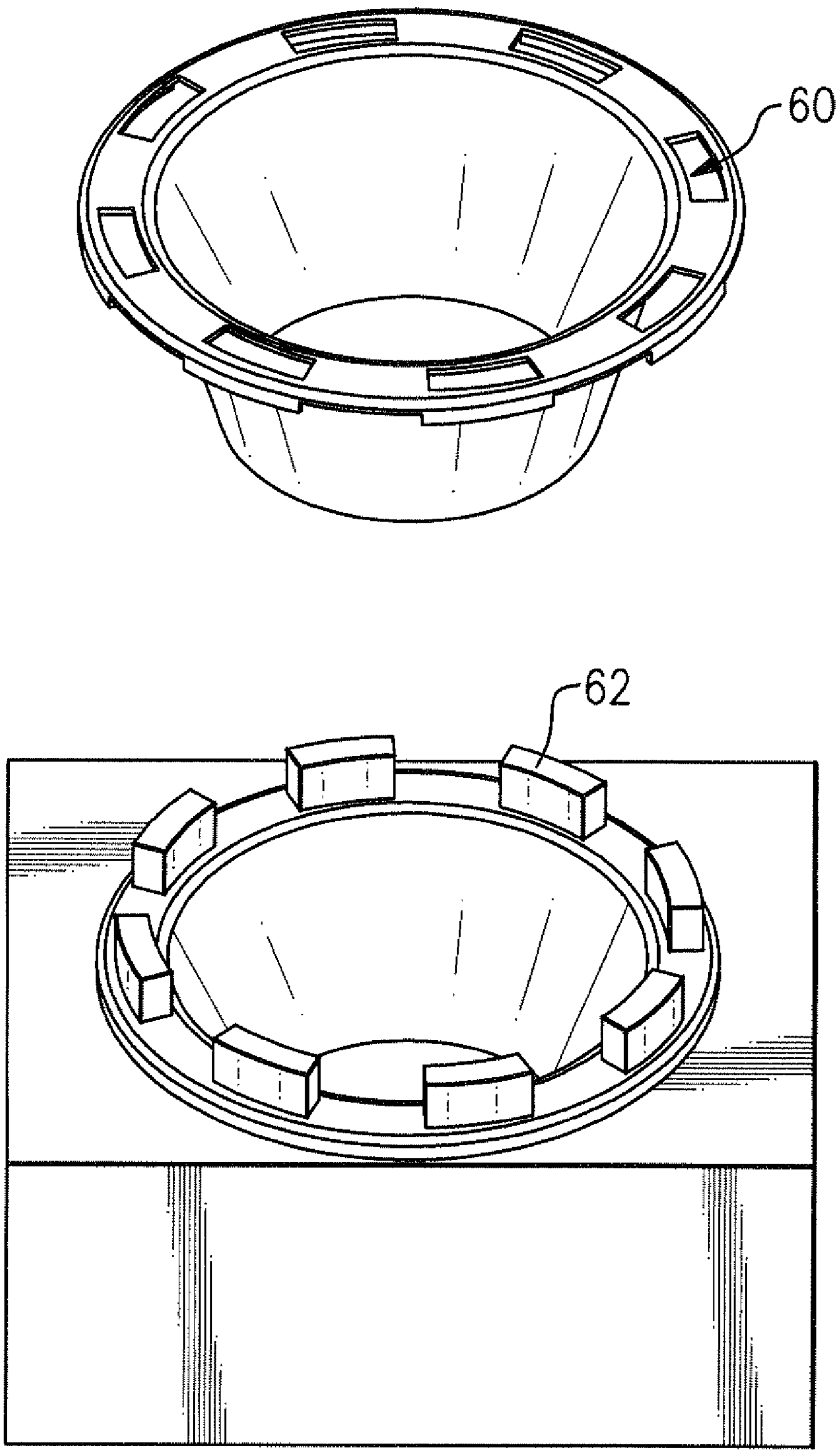
FIG. 7 is a perspective view of an alternate embodiment of a cup for holding the pill in the pill crushing device.

Base 12 includes an inner housing 20 forming a space for placement of a cup holder 22 located on a rotatable platform 24 which is driven by a motor 26. Cup holder 22 includes a central recess **22*a* shaped to receive a complimentary shaped cup such as cup 30 (FIG. 6) therein. As explained in more detail below, it is preferred that the cup not rotate with respect to the cup holder 22. To prevent such rotation, a non-circular flange such as a hexagonal flange 32 may be incorporated on cup 30 to key into a complimentary shaped recess 34 formed in the upper perimeter of recess 22*a*. It is of course understood that other cup rotation-prevention features may be used as desired, for example, as seen in FIG. 7, holes 60 in the cup flange that are keyed to protrusions 62 in the upper perimeter of the cup holder recess. Alternatively or in addition to providing a keyed feature, a textured surface "T" may be formed on one or more surfaces of central recess 22*a* to increase frictional contact with cup 30. Cup 30** may also include a textured outer surface "T" as an alternative to or in addition to a textured surface in the central recess.

Figure 5:
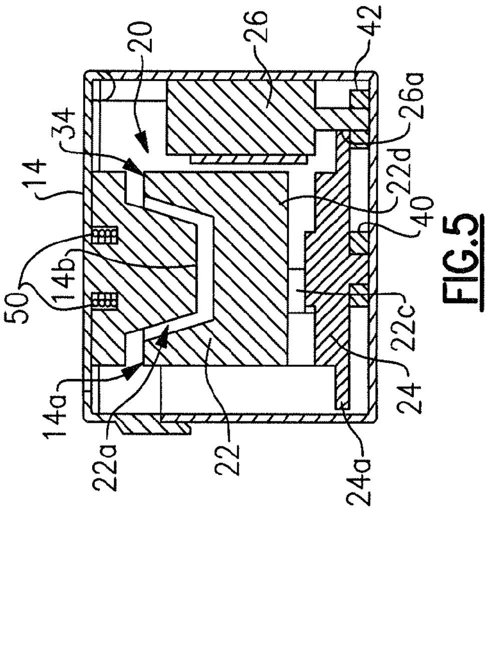
FIG. 5 is a cross-sectional view as taken along the line 5-5 in FIG. 4.

A head **14*a* is provided on the inside surface of lid 14 and is preferably shaped complimentary to the inside of cup 30 such that it nests within cup 30 when in the closed position with respect to base 12. A frustoconical shape is one possible shape for cup 30 and head 14*a* as shown in FIGS. 1, 5 and 6*a*. In one preferred embodiment, a second cup 31 is provided for nesting inside first cup 30 with one or more pills P deposited therebetween. One or both cups 30 and 31** may include a textured surface T on the inside and/or outside bottom surfaces to increase frictional contact with the pills in the manner described below.

Cup holder 22 is seated on a rotatable platform 24 journaled in bearing 40. Platform 24 includes a gear **24*a* for meshing with motor drive gear 26*a* which itself is journaled in bearing 42. Rotation of platform 24 in a first direction causes a simultaneous rotation and linear translation of cup holder 22 toward lid 14. Linear translation is provided by ramp 24*b* against which flange 22*c*, extending downwardly from cup holder bottom surface 22*d*, rides along as motor 26 rotates platform 24. This simultaneous rotational and linear movement causes pills located in cup 30 to be effectively crushed and ground against surface 14*b* of head 14*a*. To ensure a defined and reproducible force profile between cup holder 22 and head 14*a*, a spring 50 may be positioned over a post 14*c* between head 14*a* and lid 14. The linear distance of travel of cup holder 22 and the tensile strength of spring 50** are chosen to ensure the defined and reproducible force profile during pill crushing.

In a preferred embodiment, cup interrogation is a function of pill crushing device 10. Cup interrogation may be provided to: 1) ensure only intended, safe and approved cups are used with pill crushing device 10; and 2) prevent accidents such as fingers getting caught in the device by allowing motor operation only when a cup is detected in cup holder 22. A switch may also be provided adjacent lid latch 18 such that motor 26 operates only when lid 14 is closed and latched.

Cup interrogation may be provided in any of a variety of different ways. For example, a detectable element "DE" (see FIG. 6*a*) on cup 30 may be wholly or partly made out of a material whose physical or chemical characteristics are detectable by a detector "D" that may be positioned on or near cup holder 22. Some possibilities include:

1) a polymer or other material with a particular dielectric constant that may be read by a capatenance detector; or
2) an RF tag that may be read by an RF detector; or
3) a bar code that may be read by a bar code scanner; or
4) a metallic or ferrous oxide material that may be read by a resistive or magnetic detector; or
5) a proximity detector that detects when a material object is placed near the detector; or
6) an LED or other optical component detectable by an appropriate optical detector.

The above list provide examples of possible cup interrogation elements and is not to be considered as exhaustive of all possible cup interrogation means. When detectable materials are used, it is understood that the material may be in any physical form including nanoparticles and may be applied in or on cup 30 or integral therewith.

Status indicator displays or lights may also be included on device 10 to tell the user the condition of the device (e.g., opened, closed-unactuated, closed-actuated, finished, duration of crushing cycle indicator, etc.).

The invention claimed is:

1. A pill crusher, comprising:

a. a housing including a base and a lid which may be selectively moved between open and closed positions with respect to said base, said base including a cup holder shaped to receive a first cup therein, said lid including an element for breaking one or more pills placed in said first cup when said lid is in the closed position with respect to said base, said pill breaking element comprising a head shaped to be inserted into a second cup nested in said first cup, said head and said base exerting opposing forces upon said nested cups and one or more pills placed therebetween, said holder rotatably connected to said base and operable to rotate said first cup located therein with respect to said second cup which remains rotatably fixed; and b. a verification system having a detectable element connected to said first cup and a detector connected to said housing, said verification system operable to verify said first cup is authorized for use with said pill crusher.

2. The pill crusher of claim 1 wherein at least one of said cups includes a textured surface for contact with a pill located between said nested cups.

3. The pill crusher of claims 2 wherein said textured surface is located on the outside bottom surface of said first cup.

4. The pill crusher of claim 2 wherein said textured surface is located on the outside bottom surface of said second cup.

5. The pill crusher of claim 1 wherein said holder includes a textured surface to increase frictional contact with said first cup such that said first cup will resist rotating independently of said cup holder.

6. The pill crusher of claim 1 wherein the head includes a textured surface to increase frictional contact with said second cup such that said second cup will resist rotating with said first cup.

7. The pill crusher of claim 1 wherein said holder and said first cup each include cooperating interlocking features ensuring said first cup will rotate together with said base.

8. The pill crusher of claim 7 wherein said interlocking features include a non-circular flange on said first cup and a cooperatively shaped recess on said base into which said flange may be removably secured.

9. The pill crusher of claim 8 wherein said flange is multi-sided.

10. The pill crusher of claim 9 wherein said flange is hexagonal.

11. The pill crusher of claim 7 wherein said interlocking features include a flange on said first cup, said flange having one or more holes formed therethrough which may align with and removably engage a respective protrusion on said base.

12. The pill crusher of claim 1 where said detectable element is a luminous phosphorous material.

13. The pill crusher of claim 1 wherein said detectable element is an RF tag.

14. The pill crusher of claim 1 where said detectable element is a bar code.

15. The pill crusher of claim 1 wherein said detectable element is a metallic material.

16. The pill crusher of claim 1 wherein said detectable element is a ferrous oxide material.

* * * * *